INVENTOR
Renat Terlecki
BY
Ralph B. Stewart
ATTORNEY

INVENTOR
Renat Terlecki
BY
Ralph B. Stewart
ATTORNEY

INVENTOR
Renat Terlecki
BY
Ralph B. Stewart
ATTORNEY

INVENTOR
Renat Terlecki
BY
Ralph B. Stewart
ATTORNEY

INVENTOR
Renat Terlecki
BY
Ralph B. Stewart
ATTORNEY

United States Patent Office
2,831,059
Patented Apr. 15, 1958

2,831,059

ELECTRIC CARRIER TELEGRAPH SYSTEMS

Renat Terlecki, Taplow, England, assignor to British Telecommunications Research Limited, Taplow, England, a British company Application September 7, 1954, Serial No. 454,247
Claims priority, application Great Britain March 15, 1950
15 Claims. (Cl. 178—66)

Figures 1, 2, 3:
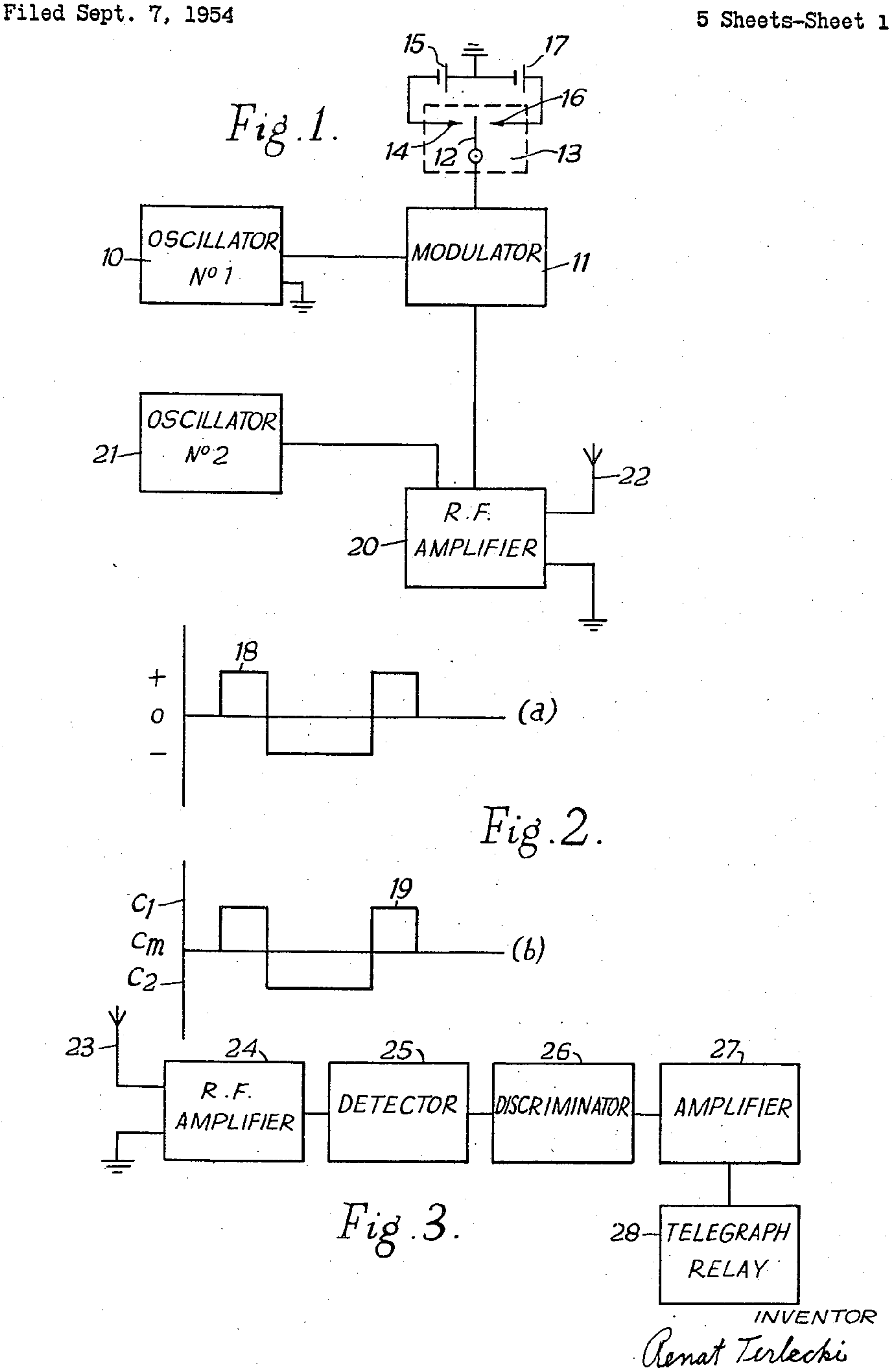

The present invention relates to electric carrier telegraph systems of the kind employing carrier frequency shift keying.

In a known system of this kind employing carrier frequency shift keying, a single carrier is transmitted and the keying operates to shift the frequency of the carrier from one value corresponding to "mark" to a second value corresponding to "space" and vice versa.

In order to economise in the frequency spectrum required for such transmissions the mark and space frequencies are made as close as possible to one another consistent with reliable resolution of the two frequencies at a receiver.

When the carrier is transmitted by radio in the high frequency band the minimum spacing between the mark and space frequencies is determined by a number of factors of which not the least important is the frequency stability of the local oscillators in a co-operating receiver.

One object of the present invention is to provide an improved electric signalling system of the kind specified in which the frequency shift can be made substantially less than in known systems of the kind specified.

According to the present invention there is provided in a two-tone telegraph signalling system the combination of a source of mark and space signals, means responsive to said mark signals for transmitting a first pair of oscillations of difference frequency $f_1$, means responsive to said space signals to transmit a second pair of oscillations of difference frequency $f_2$, the said frequency $f_2$ being different from said frequency $f_1$, means for beating together the first pair of oscillations to derive a tone current of frequency $f_1$, means for beating together the second pair of oscillations to derive a tone current of frequency $f_2$, means deriving direct current signals from said tone currents respectively, a relay device, and means selectively controlling said relay device by said direct current signals. The relay device may be of the electromagnetic type or for example an electronic relay such as a trigger pair circuit.

It will be understood that the four oscillations constituting the two pairs of oscillations may be provided by four separate sources. In another arrangement one oscillation from each pair may be of the same frequancy and provided by a single source, the other two oscillations being provided by two further sources. In another arrangement, however, only one radio frequency oscillation is employed and the remaining frequencies are obtained by beating with the single radio freqeuncy oscillations, oscillations of appropriate audio frequencies and selecting the beats of the desired frequency. It has been found that in practice satisfactory operation of a system incorporating a transmitter having two or more radio frequency oscillators can be achieved in the high frequency band in the case where the difference between the frequencies of the two carriers is shifted, by keying, from, say, 575 C./S. to 625 C./S. and vice versa.

This substantial improvement is achieved as a result of the fact that the nominal values of the two carrier oscillations can be accurately controlled at the transmitter, and at a receiver it is necessary merely to provide a suitable arrangement to detect the beats between the two carriers to provide a low frequency tone whose frequency is shifted by keying firstly to 575 C./S., then 625 C./S., and vice versa. A suitable discriminator can then readily differentiate between the frequencies of 575 C./S. and 625 C./S. in order to provide a current suitable for operating a telegraph relay or other device. A local oscillator, usually the main source of instability in a receiver is not therefore required.

With the said other arrangement employing only one radio frequency oscillator the frequency shift can be made even smaller and may be substantially less than 60 C./S. and yet provide satisfactory operation. A shift of 10 C./S. has been found to give satisfactory results when keying speeds of 25 C./S., i. e. 50 bauds, are used. This substantial reduction in frequency shift is a substantial improvement over known frequency shift keying systems.

As the onus of frequency stability in the present invention is placed entirely on the transmitter the receivers used in conjunction with the transmitter can be of lower grade than is normally necessary and less skilled operating personnel may be employed.

It will be understood, of course, that both carrier oscillations of a pair may be keyed, preferably in opposite senses. If both are keyed in the same sense the degree of frequency shift must be different for the two carriers.

According to a feature of the invention the system may be used for multi-channel signalling. For this purpose the invention provides the combination of a first source of mark and space signals, means responsive to said mark signals for transmitting a first pair of oscillations of difference frequency $f_1$, means responsive to said space signals for transmitting a second pair of oscillations of difference frequency $f_2$, said frequency $f_2$ being different from said frequency $f_1$, a second source of mark and space signals, means responsive to the mark signals from the said second source for transmitting a third pair of oscillations of difference frequency $f_3$, means responsive to space signals from said second source for transmitting a fourth pair of oscillations of difference frequency $f_4$, said frequencies $f_3$ and $f_4$ being different from one another and from the frequencies $f_1$ and $f_2$, means for beating together said first, second, third and fourth pairs of oscillations to derive tone currents of frequencies $f_1$, $f_2$, $f_3$ and $f_4$, means deriving direct current signals from said tone currents of frequencies $f_1$ and $f_2$ respectively, a first relay device, means selectively controlling said relay by said direct current signals, means deriving further direct current signals from said tone currents of frequencies $f_3$ and $f_4$ respectively, a second relay device, and means selectively controlling said second relay device by the last said direct current signals.

This application is a continuation-in-part of my application Serial No. 153,063, filed Mar. 31, 1950, now abandoned.

Figures 4, 7:
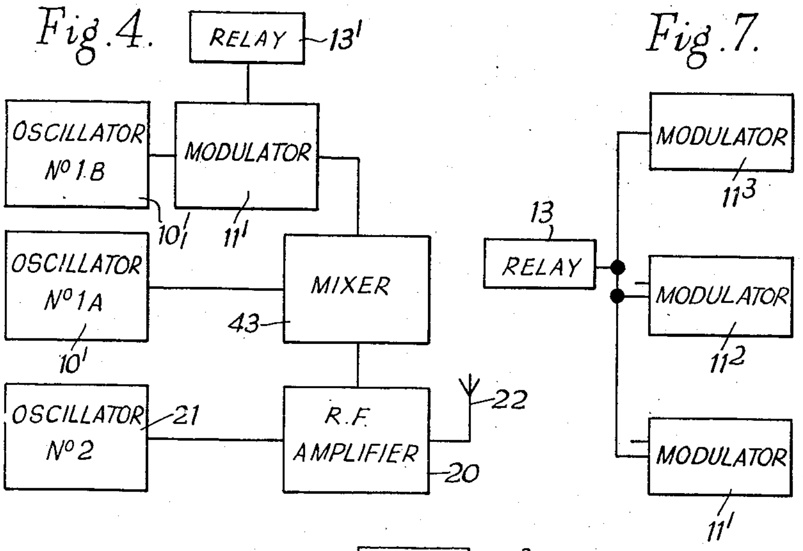
Figure 5:
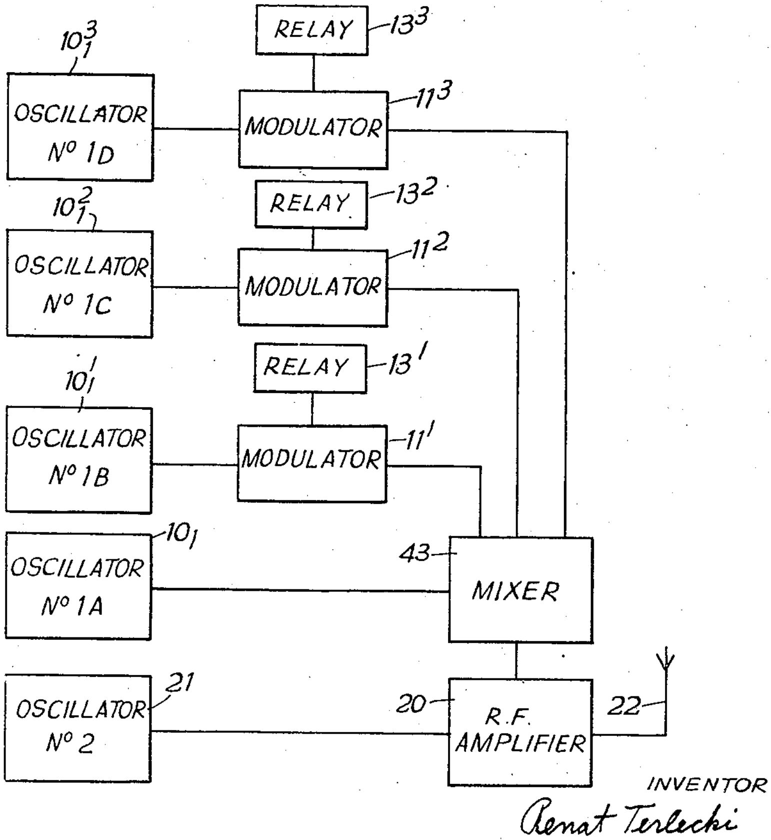
Figure 6:
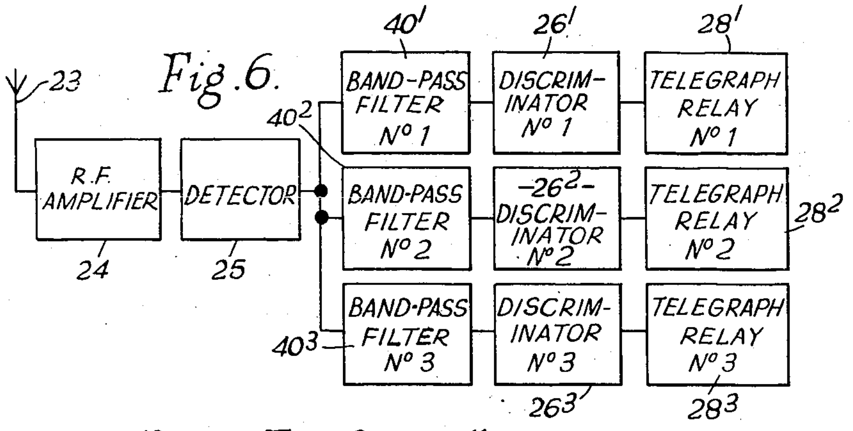
Figure 8:
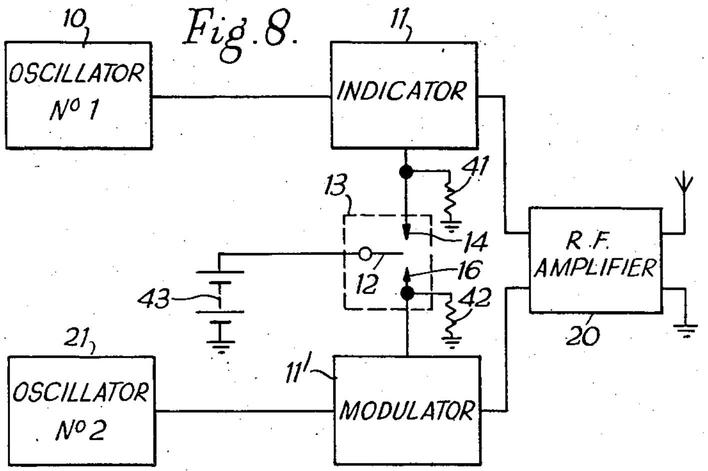
Figure 9:
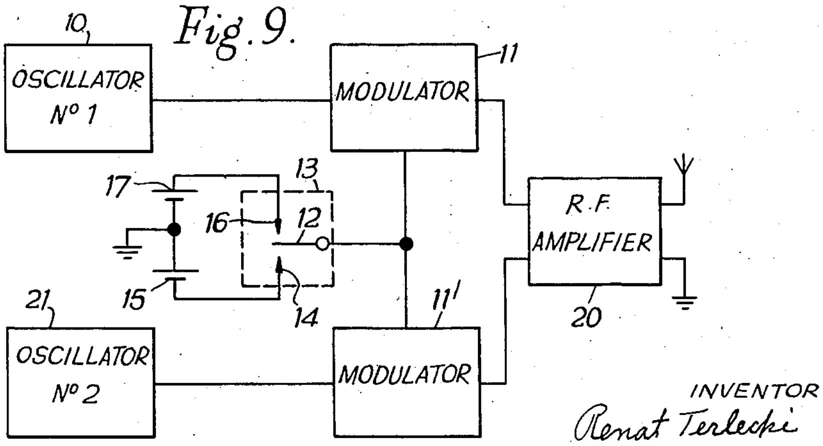
Figure 10:
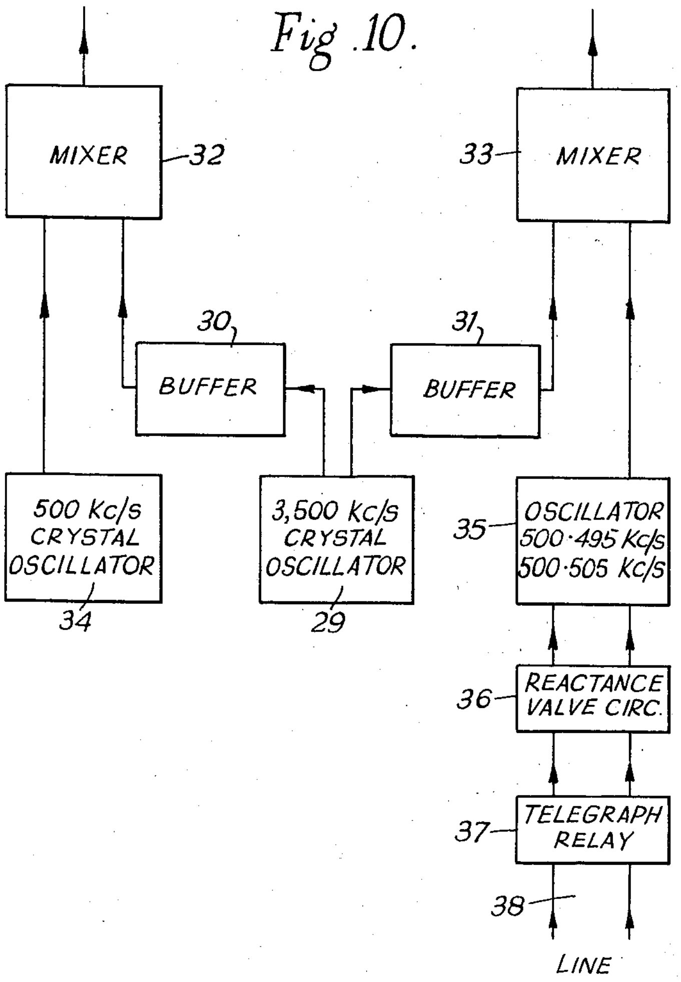
Figure 11:
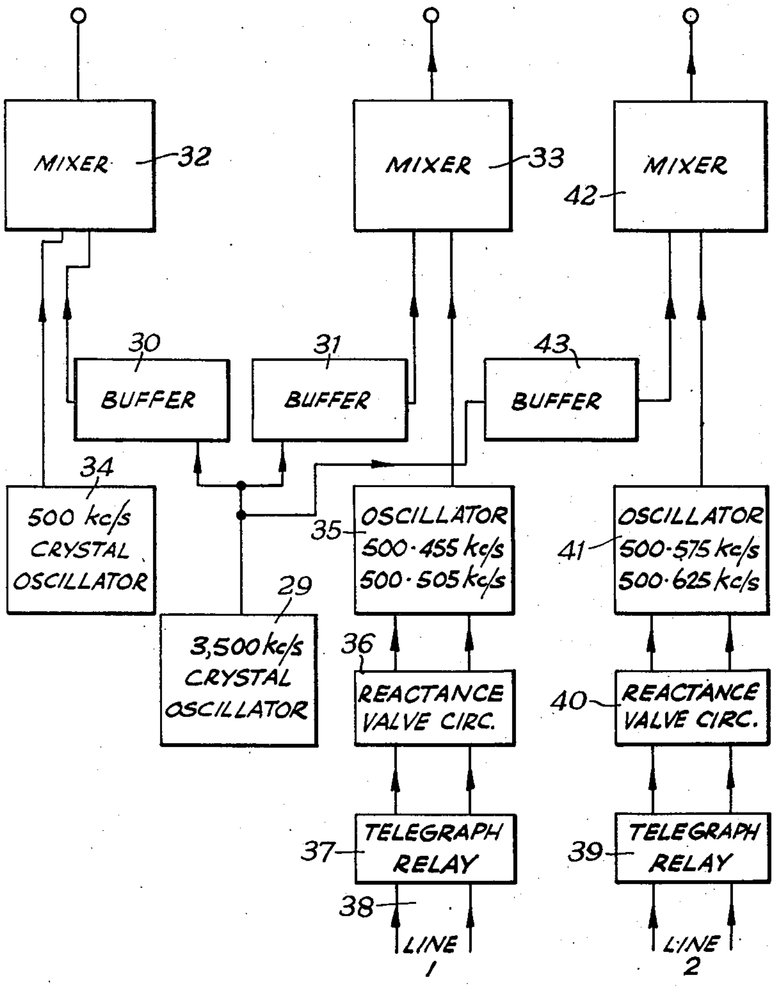

The invention will now be described with reference to the examples shown in the accompanying drawings, in which:

Figure 1 is a block schematic diagram of one example of a transmitter suitable for use in a system according to the invention, Figure 2 is an explanatory diagram, Figure 3 is a block diagram of a receiver suitable for use in conjunction with the transmitter shown in Figure 1, Figure 4 is a block schematic diagram of a further transmitter suitable for use in a system according to the invention, Figure 5 is a block schematic diagram of a third transmitter suitable for use in a system according to the invention, Figure 6 is a block schematic diagram of a receiver suitable for use in conjunction with the transmitter shown in Figure 5, Figure 7 is a block schematic diagram of part of a fourth transmitter for use with the invention, Figures 8 and 9 are block schematic diagrams of two further transmitters respectively for use with the invention, Figure 10 is a block diagram of another transmitter for single channel operation, and Figure 11 is a block circuit diagram of another transmitter for multi-channel operation.

Referring to Figure 1, the output of a first crystal-controlled oscillator 10 is applied to a frequency-modulator 11 to which modulating voltages are applied from the moving contact 12 of a telegraph relay 13. A fixed contact 14 of the relay 13 is connected to the negative pole of a battery 15 whose positive pole is earthed, and a second fixed contact 16 of the relay 13 is connected to the positive pole of a battery 17 whose negative pole is earthed.

The moving contact 12 of the relay 13 is caused to move in known manner to the two fixed contacts alternately in dependence upon the mark and space signals to be transmitted.

The voltages appearing at the moving contact of the relay 13 are of the form shown by a curve 18 in Figure 2(*a*) in which the ordinate represents voltage and the abscissa represents time. The frequency shift arising from the application of the voltage shown in Figure 2(*a*) to the modulator 11 is shown by a curve 19 in Figure 2(*b*) in which the ordinate represents frequency and the abscissa represents time to the same scale as that in Figure 2(*a*). The frequency $c_m$ is the frequency of the unmodulated output from the oscillator 10 and it will be seen that the frequency shifts between $c_1$ and $c_2$ as a result of the modulation, where $c_1$ and $c_2$ are equally spaced above and below $c_m$ respectively. The difference between $c_1$ and $c'$ may conveniently be, say 50 C./S. For example, if the mid-band frequency $c_m$ is chosen at 500,000 C./S. $c_1$ and $c_2$ would be 499,975 and 500,025 C./S. respectviely The output from the modulator 11 (Figure 1) is applied to a radio-frequency amplifier 20 together with the output from a second crystal-controlled oscillator 21. Both the modulated output of the oscillator 10 and the unmodulated output of the oscillator 21 are transmitted from an aerial 22. The frequency *c* of the output from the oscillator 21 is arranged to differ from $c_m$ by, say 400 C./S. For example, with the values $c_1$ and $c_2$ given above, the frequency of *c* would be either 499,600 or 500,400 C./S. In this example $c_1$ and $c_2$ are separated by a frequency band having a width of 50 C./S. and *c* is located outside of this band and differs from both $c_1$ and $c_2$ by less than 450 C./S.

The oscillators 10 and 21, the modulator 11 and the amplifier 20 may all be of any known or suitable type. The two oscillators are preferably enclosed in a single temperature-controlled oven (not shown).

The amplifier 20 may contain one or more frequency multiplying stages. In this event the frequencies of the oscillators 10 and 21 are made $c_m/x$ and $c/x$ respectively, and the frequency shift produced by the modulator 11 is made $50/x$, where $x$ is the overall multiplication factor used in the amplifier 20.

Figure 3 shows a receiver suitable for use in receiving signals transmitted by the arrangement of Figure 1, and comprises an aerial 23, a radio-frequency amplifier 24, a detector 25, a frequency discriminator 26, an amplifier 27 and a telegraph relay 28.

As the oscillation of frequency *c* is transmitted by the arrangement shown in Figure 1, no local beat frequency oscillator is required in the receiver to obtain the audio frequency tones. The output of the detector 25 is in the form of a low frequency tone whose frequency shifts from 375 C./S. to 425 C./S. and vice versa in dependence upon the signals transmitted. This tone is applied to the discriminator 26 which provides an output of the form shown in Figure 2(*a*). This output is applied through the amplifier 27 to the telegraph relay 28. The amplifier 24, detector 25, discriminator 26, amplifier 27 and relay 28 may all be of any known or suitable type, and it will be understood that a superheterodyne receiver may be used if the simple receiver shown does not provide adequate selectivity.

Figure 4 is a block schematic diagram of a further transmitter according to the invention. The oscillator 10 of Figure 1 is replaced by two oscillators $10_1$ and $10_1^1$. Of these two oscillators, $10_1$ is of relatively high frequency and $10_1^1$ is of relatively low frequency. The output of the oscillator $10_1^1$ is passed through a frequency modulator $11^1$, to which the relay $13^1$ is connected, and the outputs from the modulator $11^1$ and the oscillator $10_1$ are applied to a mixer 43 which operates in known manner to derive an output whose frequency is equal to the sum of the frequencies of the outputs from the modulator $11^1$ and the oscillator $10_1$. The output from the mixer 43 is applied to the amplifier 20 together with the oscillation from the oscillator 21.

Referring to Figure 5, this shows an arrangement suitable for transmitting signals of three different channels. The signals are provided by three relays $13^1$, $13^2$ and $13^3$. Signals of the first channel are provided by the relay $13^1$ and are transmitted as described with reference to Figure 4. The difference between the frequency of the oscillator 21 and the mark and space frequencies of the output of the mixer 43 in respect of signals in the first channel may conveniently be 375 and 425 C./S. The signals of the second channel are provided by the relay $13^2$ and are applied to a modulator $11^2$ which serves to modulate the frequency of the output from an oscillator $10_1^2$. The ouput of the modulator $11^2$ is applied to the mixer 43 where it produces with the oscillation from the oscillator $10_1$ mark and space frequencies which differ from the frequency of the oscillator 21 by 525 and 575 C./S. respectively. A suitable filter (not shown) selects these frequencies for application to the amplifier 20. Signals of the third channel are provided by the relay $13^3$ and are applied to a frequency-modulator $11^3$ which modulates the output of an oscillator $10_1^3$. The output of the modulator $11^3$ is applied to the mixer 43 where it produces, with the oscillation from the oscillator $10_1$, mark and space frequencies which differ from the frequency of the oscillator 21 by 675 and 725 C./S. respectively. A further suitable filter (not shown) selects these frequencies for application to the amplifier 20.

Assuming that mark and space signals are being transmitted in each of three channels, that the unmodulated frequency $c_m$ from oscillator 10 is 500,00 C./S. and that the frequency of the oscillations *c* supplied from 21 is 499,600 C./S. (differing from the unmodulated carrier from oscillator 10 by 400 C./S. as suggested with respect to Figure 1), it will be evident that in order to produce at the receiver the difference frequencies of 375 C./S. and 425 C./S. for channel 1, 525 C./S. and 575 C./S. for channel 2 and 675 C./S. and 725 C./S. for channel 3, the pairs of oscillations transmitted would be the following:

Channel 1—mark signal=499,975 C./S. and 499,600 C./S.

Channel 1—space signal=500,025 C./S. and 499,600 C./S.

Channel 2—mark signal=500,125 C./S. and 499,600 C./S.

Channel 2—space signal=500,175 C./S. and 499,600 C./S.

Channel 3—mark signal=500,275 C./S. and 499,600 C./S.

Channel 3—space signal=500,325 C./S. and 499,600 C./S.

It is evident, of course, that other carrier frequencies and other difference frequencies could as well be used in carrying out the invention, but that in any case the frequency-shift in keying to go from one carrier to another in response to mark and space signals may as in the assumed case be 50 C./S., and in any event may be substantially less than 60 C./S. while yet providing satisfactory operation, and may be as low as 10 C./S., the latter a shift that was tried and found to give satisfactory results when keying speeds of 50 bauds were used (see column 2, lines 17 to 19).

Figure 6 shows a suitable receiver for use in conjunction with the transmitter of Figure 5, and comprises an aerial 23, a radio-frequency amplifier 24 and a detector 25. The output of the detector is applied to three band-pass filters $40^1$, $40^2$ and $40^3$, each of which has a pass-band of 50 C./S., the pass-bands of the three filters being centered on the frequencies 400 C./S., 550 C./S., and 700 C./S. respectively. Signals in the three channels appear, therefore, in the outputs of the three band-pass filters respectively, and are applied to three frequency discriminators $26^1$, $26^2$ and $26^3$ respectively which provide current suitable for application to three telegraph relays $28^1$, $28^2$ and $28^3$ respectively.

It will be understood that the transmitter as shown in Figure 5 may also be used for frequency diversity working by supplying identical keying voltages to all three modulators $11^1$, $11^2$ and $11^3$ simultaneously, as shown in Figure 7. It will be seen in Figure 7 that the output of the relay 13 is applied to all three modulators.

Figure 8 shows an arrangement in which the oscillations from both oscillators 10 and 21 of Figure 1 are modulated and comprises a second modulator 11′ for shifting the frequency of the output from the second oscillator 21. In this arrangement the frequencies of the two oscillations are shifted in opposite senses. The input terminals of the two modulators are normally earthed through resistors 41 and 42 respectively. The fixed contact 14 of the relay 13 is connected to the input terminal of the modulator 11, the fixed contact 16 is connected to the input terminal of the modulator 11′, and the moving contact 12 is connected to the positive pole of a battery 43 whose negative pole is earthed. In operation, therefore, the input terminal of first one of the modulators then the other is made positive and when one is made positive the other is reduced to earth potential.

Figure 9 shows an arrangement in which the frequencies of both oscillations are shifted in the same sense but by different amounts. The inputs to the two modulators from the relay 13 are identical but the degree of frequency shift produced by the two modulators is arranged to be different.

Referring now to Figure 10, this is a block schematic diagram of a further form of the invention for a single channel operation.

A single radio-frequency oscillator 29 is connected through two buffer stages 30 and 31 to two mixers 32 and 33 respectively. A relatively low frequency oscillator 34 of fixed frequency is connected to the mixer 32 and a second relatively low frequency oscillator 35 of variable frequency is connected to the mixer 33. The frequency of the oscillator 35 can be varied to two values alternately corresponding to mark and space by means of a reactance valve circuit 36 which is controlled by a telegraph relay 37 operated from a line 38.

The outputs of the two mixers 32 and 33 may be amplified in a suitable radio-frequency amplifier (not shown) and are fed to either a common aerial or two separate aerials (not shown). The radio frequency amplifiers may of course include one or more stages of frequency multiplication.

In one example the crystal oscillator 29 has a frequency of 3500 kc./s., the fixed-frequency low-frequency oscillator 34 a frequency of 500 kc./s., and the variable-frequency, low-frequency oscillator 35 a frequency of 500.495 kc./s. or 500.505 kc./s. depending upon whether a mark or space signal is being transmitted. Thus if there is no multiplication there is radiated a carrier of fixed frequency 4000 kc./s. and a second carrier of frequency alternately 4000.495 kc./s. and 4000.505 kc./s. The frequency shift is therefore in this example 0.01 kc./s. or, in other words, 10 C./S.

Since a common radio-frequency oscillator 29 is used in the generation of all transmitted oscillations and since the relatively low-frequency oscillations are used in conjunction with the radio-frequency oscillator, a very high degree of frequency stability is obtainable and the frequency difference between mark and space signals can be made very low. The performance of an associated receiver will be independent of variations in the absolute values of the carrier frequencies within the pass-band of the receiver and dependent only upon the frequency stability of the low-frequency oscillators. It is even independent of the low frequencies and dependent only upon the difference between the low frequencies used.

The radio-frequency oscillator together with the low-frequency oscillators may be arranged within a common temperature controlled oven. In this way it can be arranged that even such small changes as may occur in the low frequencies take place in the same sense and by substantially identical amounts.

The arrangement of Figure 10 may be extended for providing multi-channel facilities as shown for example in Figure 11. Each additional channel is provided by the addition of a further telegraph relay 39, reactance valve circuit 40, variable-frequency, low-frequency oscillator 41, and mixer 42.

One input of the further mixer 42 is supplied from the radio-frequency oscillator 29 through a buffer stage 43 and the other input of the mixer 42 is supplied from the variable frequency oscillator 41. The variable-frequency oscillator 41 may be caused by the reactance valve circuit 40 to shift its frequency to the values 500.615 kc./s. and 500.625 kc./s. alternately. Thus the second channel is represented by a carrier of the fixed frequency 4000 kc./s. appearing at the output of the mixer 32 and a second carrier whose frequency is 4000.615 kc./s. and 4000.625 kc./s. depending upon whether a mark or a space signal is being transmitted.

It will be obvious to those skilled in the art that further channels may be added in like manner and that all oscillators may be arranged in a common oven.

The receivers hereinbefore described may be employed in conjunction with the transmitters of Figures 10 and 11. The receivers merely require obvious modifications to take account of the different frequencies and frequency shifts used.

I claim:

1. In a two-tone telegraph signalling system the combination of a source of mark and space signals, a radio-frequency oscillator of frequency $c_1$, a second oscillator of relatively low frequency $c_2$, a mixer, means for applying the outputs of said radio-frequency oscillator and said relatively low-frequency oscillator to said mixer to derive a further oscillation of frequency $c$, a variable-frequency oscillator of relatively low frequency, means for applying said mark and space signals to vary the frequency of said variable-frequency oscillator to two values $o_3$ and $o_4$ alternately, a second mixer, means for applying the outputs of said radio-frequency oscillator and said variable-frequency oscillator to said second mixer to derive further oscillations of frequencies $c_1$ and $c_2$, means for transmitting said oscillations of the frequencies $c$, $c_1$ and $c_2$, means for beating together said oscillations of frequencies $c$ and $c_1$ to derive tone currents of difference frequency $f_1$ and for beating together said oscillations of frequencies $c$ and $c_2$ to derive tone currents of difference frequency $f_2$, means deriving direct current signals from said tone currents $f_1$ and $f_2$, a relay device, and means selectively controlling said relay device by the said direct current signals.

2. In a two-tone telegraph signalling system the combination of a source of mark and space signals, a radio-frequency oscillator of frequency $o_1$, a second oscillator of relatively low frequency $o_2$, a mixer, means for applying the outputs of said radio-frequency oscillator and said relatively low-frequency oscillator to said mixer to derive a further oscillation of frequency $c$, a variable-frequency oscillator also of relatively low frequency, means for applying said mark and space signals to vary the frequency of said variable-frequency oscillator to two values $o_3$ and $o_4$ alternately, a second mixer, means for applying the outputs of said radio-frequency oscillator and said variable-frequency oscillator to said second mixer to derive further oscillations of frequencies $c_1$ and $c_2$, means for transmitting said oscillations of the frequencies $c$, $c_1$ and $c_2$, means for beating together said oscillations of frequencies $c$ and $c_1$ to derive tone currents of difference frequency $f_1$ and for beating together said oscillations of frequencies $c$ and $c_2$ to derive tone currents of difference frequency $f_2$, means deriving direct current signals of opposite polarities from said tone currents $f_1$ and $f_2$, a relay device, and means for selectively controlling said relay device by said direct current signals.

3. A frequency diversity signally system, comprising a source of mark and space signals, means responsive to said mark signals for transmitting first and second pairs of oscillations of difference frequencies $f_1$ and $f_2$ respectively, the said frequency $f_2$ being different from the frequency $f_1$, means responsive to said space signals for transmitting third and fourth pairs of oscillations of difference frequencies $f_3$ and $f_4$ respectively, the said frequencies $f_3$ and $f_4$ being different from one another and from the frequencies $f_1$ and $f_2$, means for beating together said first and second, and said third and fourth pairs of oscillations to derive tone currents of frequencies $f_1$, $f_2$, $f_3$ and $f_4$, means deriving first direct current signals from said tone currents of frequencies $f_1$ and $f_2$, means deriving second direct current signals from said tone currents of frequencies $f_3$ and $f_4$, a relay device, and means selectively controlling said relay device by the said direct current signals.

4. A frequency diversity signalling system, comprising a source of mark and space signals, means responsive to said mark signals to transmit first, second and third oscillations, the second and third oscillations differing from the first oscillation by the frequencies $f_1$ and $f_2$ respectively and the said frequency $f_2$ being different from $f_1$, means responsive to said space signals to transmit said first oscillation and fourth and fifth oscillations, the fourth and fifth oscillations differing from the first oscillation by frequencies $f_3$ and $f_4$ respectively and the frequencies $f_3$ and $f_4$ being different from one another and from the frequencies $f_1$ and $f_2$, means for beating together said first, second and third, and said first, fourth and fifth oscillations to derive tone currents of the frequencies $f_1$, $f_2$, $f_3$ and $f_4$, means deriving first direct current signals from said tone currents of frequencies $f_1$ and $f_2$, means deriving second direct current signals from said tone currents of frequencies $f_3$ and $f_4$, a relay device and means selectively controlling said relay device by said first and second direct current signals.

5. A multi-channel, frequency-shift, carrier, telegraph, signalling system comprising a first source of mark and space signals, a radio-frequency oscillator of frequency $o_1$, a relatively low frequency oscillator of frequency $o_2$, a first mixer, means for applying the outputs of said radio-frequency oscillator of said relatively low-frequency oscillator to said mixer to derive a further oscillation of frequency $c$, a first variable-frequency oscillator also of relatively low frequency, means for applying said mark and space signals to said variable-frequency oscillator to vary the frequency thereof to two values $o_3$ and $o_4$ alternately, a second mixer, means for applying the outputs of said radio-frequency oscillator and first variable-frequency oscillator to said second mixer to derive oscillations of frequencies $c_1$ and $c_2$ alternately, a second source of mark and space signals, a second variable-frequency oscillator of relatively low frequency, means for applying said mark and space signals from said second source to vary the frequency of said second variable-frequency oscillator to two values $o_5$ and $o_6$ alternately, a third mixer, means for applying the outputs of said radio-frequency oscillator and said second variable-frequency oscillator to said third mixer to derive oscillations of frequencies $c_3$ and $c_4$, mean for transmitting said oscillations of frequencies $c$, $c_1$, $c_2$, $c_3$ and $c_4$, means for beating together said oscillations of frequencies $c$, $c_1$ and $c_2$ to derive first tone currents of difference frequencies $f_1$ and $f_2$ and for beating together said oscillations of frequencies $c$, $c_3$ and $c_4$ to derive second tone currents of difference frequencies $f_3$ and $f_4$, means deriving first and second direct current signals from said first and second tone currents $f_1$, $f_2$ and $f_3$, $f_4$ respectively, two relay devices, means selectively controlling one of said relay devices by said first direct current signals, and means selectively controlling the other of said relay devices by said second direct current signals.

6. In a transmitter suitable for use in a two-tone telegraph signalling system, the combination of a radio-frequency first oscillator of frequency $o_1$, a relatively low-frequency second oscillator of frequency $o_2$, a first mixer, means for applying oscillations from said first and second oscillators to said mixer to derive an oscillation of frequency $c$, a variable-frequency third oscillator of relatively low frequency, a source of mark and space signals, means for applying said mark and space signals to said variable-frequency oscillator to vary the frequency thereof to two values $o_3$ and $o_4$ alternately, a second mixer, means for applying the oscillations of frequencies $o_3$ and $o_4$ from said third oscillator together with oscillations of the frequency $o_1$ from said first oscillator to the second mixer to derive oscillations of frequencies $c_1$ and $c_2$, and means for transmitting said oscillations of the frequencies $c$, $c_1$ and $c_2$.

7. In a transmitter as claimed in claim 6, the addition of a variable-frequency fourth oscillator of relatively low frequency, a second source of mark and space signals, means for applying said mark and space signals from said second source to vary the frequency of said fourth oscillator to two values $o_5$ and $o_6$ alternately, a third mixer, means for applying oscillations of the frequency $o_1$ from said first oscillator together with oscillations of the frequencies $o_5$ and $o_6$ from said fourth oscillator to said third mixer to derive oscillations of frequencies $c_3$ and $c_4$ and means for transmitting said oscillations of frequencies $c_3$ and $c_4$.

8. A telegraph transmitter comprising a source of mark and space signals, means responsive to said mark signals to transmit a first pair of carrier oscillations of different frequencies and responsive to said space signals to transmit a second pair of carrier oscillations of different frequencies, the difference between the frequencies of said first and second pairs being different, and means responsive to said mark signals to transmit a third pair of carrier oscillations of different frequencies and responsive to said space signals to transmit a fourth pair of carrier oscillations, the difference between the frequencies of said third and fourth pairs being different from one another and from the differences between the frequencies of said first and second pairs respectively.

9. A telegraph transmitter as claimed in claim 8, wherein the frequencies of four of said oscillations, one from each of the four said pairs, are equal.

10. A telegraph system comprising a transmitter and a receiver, said transmitter comprising a source of mark and space signals, a first source of radio frequency carrier wave, modulator means controlled by said mark and space signals for shifting the frequency of said carrier wave between two values which differ by approximately 50 cycles per second, means for radiating said modulated carrier wave, and means for simultaneously radiating a second carrier wave of a fixed frequency of a value differing from the mid-frequency of said first source of carrier wave by approximately 600 cycles per second, and said receiver comprising means to receive both carrier waves, means for deriving from said received waves beat waves of frequencies corresponding to the difference in frequency between said second carrier wave and the two frequency values of said first carrier wave, a signal device, and a discriminator for operating said signal device by said beat frequency waves.

11. A telegraph transmitter comprising a source of mark and space signals, a first source of radio frequency carrier wave, modulator means controlled by said mark and space signals for shifting the frequency of said carrier wave between two values which are separated by a frequency band having a width of the order of 50 cyles per second, means for radiating said modulated carrier wave, and means for simultaneously radiating a second carrier wave of a fixed frequency lying outside of said frequency band and differing from each of said frequency values by less than 650 cycles per second.

12. A telegraph transmitter system comprising means forming a transmission channel, a pair of radio-frequency oscillators generating oscillations of radio-frequency and which differ by a small audio frequency, means including frequency-modulating apparatus connecting one of said oscillators to said transmission channel, a source of mark and space signals, means applying said mark and space signals to said frequency-modulating apparatus to shift the frequency of oscillations supplied to said channel from said one oscillator between two radio-frequency values alternately, and connections for applying oscillations from the other oscillator to said transmission channel without a frequency shift.

13. In a two-tone telegraph signalling system the combination of a source of mark and space signals, means responsive to said mark signals for transmitting a first pair of radio frequency oscillations of difference frequency $f_1$, means responsive to said space signals for transmitting a second pair of radio-frequency oscillations of difference frequency $f_2$ which is different for $f_1$, means for applying the transmitted oscillations at radio frequency to a non-linear element to produce tone currents of the frequencies $f_1$ and $f_2$ respectively, means deriving direct current signals from said tone currents respectively, a relay device, and means selectively controlling said relay device by said direct current signals.

14. In a two-tone telegraph signalling system, the combination of a source of mark and space signals, means responsive to said mark signals for transmitting a first pair of radio-frequency oscillations of difference frequency $f_1$, means responsive to said space signals to transmit a second pair of radio-frequency oscillations of difference frequency $f_2$ which is different from $f_1$, means for converting the transmitted radio-frequency oscillations to intermediate radio-frequency, means for applying the oscillations of intermediate radio-frequency to a non-linear element to produce tone currents of the frequencies $f_1$ and $f_2$ respectively, means deriving direct current signals from said tone currents respectively, a relay device, and means selectively controlling said relay device by said direct current signals.

15. In a two-tone telegraph signalling system the combination of a source of mark and space signals, means responsive to said mark signals for transmitting a first pair of oscillations of difference frequency $f_1$, means responsive to said space signals for transmitting a second pair of oscillations of difference frequency $f_2$ which is different from $f_1$, means for applying the received oscillations without frequency change to a non-linear element to produce tone currents of the frequencies $f_1$ and $f_2$ respectively, means deriving direct current signals from said tone currents respectively, a relay device, and means selectively controlling said relay device by said direct current signals.

References Cited in the file of this patent

UNITED STATES PATENTS

| | | |
|---|---|---|
| 2,378,013 | Hilferty | June 12, 1945 |
| 2,406,034 | Phelps | Aug. 20, 1946 |
| 2,685,079 | Hoeppner | July 27, 1954 |